United States Patent
Scragg, Jr. et al.

(10) Patent No.: US 9,244,699 B2
(45) Date of Patent: *Jan. 26, 2016

(54) METHOD AND SYSTEM FOR AUDIO DEVICE VIRTUALIZATION

(75) Inventors: Anthony K. Scragg, Jr., Coconut Creek, FL (US); Craig S. Siegman, Pembroke Pines, FL (US); Michael Straub, Boca Raton, FL (US); Agustin Roca, Deerfield Beach, FL (US)

(73) Assignee: Avocent Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/070,175

(22) Filed: Mar. 23, 2011

(65) Prior Publication Data

US 2012/0246355 A1 Sep. 27, 2012

(51) Int. Cl.
- *G06F 13/00* (2006.01)
- *G06F 3/00* (2006.01)
- *G06F 9/44* (2006.01)

(52) U.S. Cl.
CPC .................................. *G06F 9/4445* (2013.01)

(58) Field of Classification Search
None
See application file for complete search history.

(56) References Cited

U.S. PATENT DOCUMENTS

| | | | |
|---|---|---|---|
| 6,481,621 B1 | 11/2002 | Herrendoerfer et al. | |
| 7,478,180 B1* | 1/2009 | Li ................................... | 710/62 |
| 7,640,382 B2* | 12/2009 | Blackwell ............... | G06F 13/12 710/62 |
| 2005/0044236 A1 | 2/2005 | Stafford | |
| 2005/0108375 A1 | 5/2005 | Hallak-Stamler | |
| 2005/0182883 A1* | 8/2005 | Overtoom ........... | G06F 11/3648 710/305 |
| 2006/0123129 A1 | 6/2006 | Toebes et al. | |
| 2007/0011374 A1* | 1/2007 | Kumar et al. .................. | 710/105 |
| 2007/0124536 A1 | 5/2007 | Carper | |
| 2007/0174033 A1* | 7/2007 | Huang et al. .................... | 703/24 |
| 2007/0204153 A1 | 8/2007 | Tome et al. | |
| 2007/0288681 A1 | 12/2007 | Lee et al. | |
| 2008/0005446 A1* | 1/2008 | Frantz et al. .................. | 710/313 |
| 2008/0028120 A1* | 1/2008 | McLeod ....................... | 710/313 |

(Continued)

FOREIGN PATENT DOCUMENTS

| | | |
|---|---|---|
| TW | 200723060 | 6/2007 |
| WO | WO 02/088975 | 11/2002 |
| WO | WO 2007/067191 | 6/2007 |

OTHER PUBLICATIONS

"Virtualization". Dictionary.com definition. Viewed Apr. 1, 2014. Available: http://dictionary.reference.com/browse/virtualization?s=t.*

(Continued)

*Primary Examiner* — Michael Sun
(74) *Attorney, Agent, or Firm* — Davidson Berquist Jackson & Gowdey LLP

(57) ABSTRACT

Methods and systems are provided to allow personal computer users to virtualize a local audio device so that they can remotely connect to a server and interact with the server as if the local audio device was physically connected to the server. They connect a remote audio target hardware device to the target system through a physical USB connection, and the device interacts with the local user's computer over a network. The target system is unaware that the audio device is not connected directly to the system through a physical connection, and the target system does not need special software to implement the remote audio device. The audio target hardware device connected to the target computer may be physically connected and disconnected.

18 Claims, 4 Drawing Sheets

(56) References Cited

U.S. PATENT DOCUMENTS

| | | | |
|---|---|---|---|
| 2008/0046967 | A1 | 2/2008 | Pan et al. |
| 2008/0071950 | A1* | 3/2008 | Justice .......................... 710/100 |
| 2008/0147909 | A1 | 6/2008 | Zhang |
| 2008/0168118 | A1* | 7/2008 | Hickey et al. ................. 709/201 |
| 2008/0218581 | A1* | 9/2008 | Tsai ........................... 348/14.04 |
| 2009/0204965 | A1* | 8/2009 | Tanaka et al. ..................... 718/1 |
| 2009/0327418 | A1* | 12/2009 | Zhang et al. .................. 709/204 |
| 2010/0162235 | A1 | 6/2010 | Ginzton et al. |
| 2010/0186076 | A1 | 7/2010 | Ali et al. |
| 2010/0327059 | A1 | 12/2010 | Dean |
| 2011/0119666 | A1* | 5/2011 | Flynn ................................ 718/1 |
| 2011/0161482 | A1* | 6/2011 | Bonola ................. G06F 9/5077 709/223 |

OTHER PUBLICATIONS

Virtualization. Wikipedia, the free encyclopedia. Viewed Apr. 1, 2014. Available: http://en.wikipedia.org/wiki/Virtualization.*
CN Appln. No. 201220113443.8—Aug. 22, 2012 SIPO Office Action with English translation.
International Search Report and Written Opinion mailed Apr. 24, 2012 in PCT/US2012/028897.
CN Appln. No. 201220113511.0—Aug. 8, 2012 SIPO Office Action.
Extended European Search Report for 10794477.9 from PCT_US2010001684 dated May 22, 2013.
International Search Report and Written Opinion from PCT Appln. No. PCT/US2010/001684 mailed Aug. 9, 2010.
International Search Report and Written Opinion mailed May 23, 2012 in PCT/US2012/028443.
PCT International Preliminary Report mailed Oct. 3, 2013.
PCT International Preliminary Report mailed Oct. 3, 2013, in PCT/US20121/028897.
Preliminary Report on Patentability mailed Jan. 12, 2012 in PCT/US2010/001684.
U.S. Appl. No. 12/458,086—Oct. 20, 2011, PTO Office Action.
U.S. Appl. No. 12/458,086—Jun. 15, 2012 PTO Office Action.
U.S. Appl. No. 12/458,086—Dec. 11, 2012 PTO Office Action.
U.S. Appl. No. 13/069,726—Feb. 1, 2012 PTO Office Action.
U.S. Appl. No. 13/069,726—Oct. 12, 2012 PTO Office Action.
Cn Appln. No. 201080024001 Dec. 4, 2013 Office Action w/English translation.
"Virtualization" Wikipedia, the free encyclopedia. Viewed Apr. 1, 2014. Available http://en.wikipeida.org.wiki/Virtualization.
"Virtualization". Dictionary.com definition Viewed Apr. 1, 2014. Available http://dictionary.reference.com/browse/virtualization?s=t.
U.S. Appl. No. 13/069,726—Apr. 2, 2014 PTO Office Action.
CN 201080024001.X—Decision on Rejection issued Jan. 12, 2015.
EP Appln. No. 12760326.4—Supplemental Search Report mailed Oct. 24, 2014.
CN Appln. No. 201080024001,X—Office Action issued Jun. 4, 2015.

* cited by examiner

METHOD AND SYSTEM FOR AUDIO DEVICE VIRTUALIZATION

This application is related to U.S. patent application Ser. No. 12/458,086, entitled "Method and System for Smart Card Virtualization," and U.S. patent application Ser. No. 13/069,726, entitled "Method and System for USB Device Virtualization," which are hereby incorporated by reference.

FIELD OF INVENTION

This generally relates to audio devices connected to computers and more particularly to virtualization of an audio device over a network.

BACKGROUND

USB (Universal Serial Bus) connections are commonly used to establish communication between devices and a host controller (usually personal computers). USB has replaced many varieties of serial and parallel ports, and can connect various computer peripherals such as mice, keyboards, digital cameras, printers, personal media players, flash drives, and external hard drives to a computer. For many of those devices, USB has become the standard connection method. USB was designed for personal computers, but it has become commonplace on other devices such as smart phones, PDAs and video game consoles, and as a power cord between a device and an AC adapter plugged into a wall plug for charging.

In another aspect of computing, systems exist to facilitate remote control of and access to a computer by an operator at a remote station. Such systems typically use a device or mechanism that enables an operator at a remote station to control aspects of a so-called target (or local) computer. More particularly, such systems typically allow a remote station to provide mouse and keyboard input to the target computer and further allow the remote station to view the video display output of the target computer. These types of systems are typically called keyboard-video-mouse (KVM) systems.

Remote KVM systems allow a user to interact with a computer anywhere in the world via the keyboard, mouse, and video, as if they were seated right next to the computer. In addition to virtualization of the keyboard, mouse and video, storage media such as CD/DVD-ROMs, flash drives, and floppy disks have also been virtualized. As such, a user can provide access to data on a disk to a server anywhere in the world. Audio systems, such as sound cards, speakers, and microphones may also be virtualized. KVM systems, however, are not necessary for virtualization of audio.

Some conventional systems virtualize audio, USB and other devices over a network. In such systems, a user may use an audio device connected to a remote computer as if it was connected to the local computer. Conventional audio-over-IP systems allow a user to use an audio device in one location while it is virtualized from a PC in another location and provide special software installed and running on the target computer to interact with an audio device. However, this software running on the target must be specifically tailored, requires greater overhead and infrastructure, and provides less flexibility. These products also require special software be installed on both the local PC and the remote PC. Installing software on the client PC may be acceptable, but installing it on the target PC is typically not as it may violate the security of the computer to be accessed.

The remote target computer does not typically virtualize an audio device without the installation of software on the target computer. Accordingly, there is a desire for a system that provides virtualization of an audio device use while not requiring special software to do so.

SUMMARY

In accordance with methods and systems consistent with the present invention, a data processing system for virtualization of an audio device is provided comprising a target computer configured to send and receive audio device data to a locally connected device, and a client computer comprising an audio device. The system further comprises an audio virtualization device locally physically connected to the target computer, configured to receive audio device data from the client audio device over the network, process the received audio device data and send the processed audio device data to the locally connected target computer through a physical USB connection.

In one implementation, an audio virtualization device is provided comprising a network interface configured to interact with a client computer to send audio device data and receive audio device data over a network, and a USB input/output interface configured to physically connect to a target computer in a USB port, to receive USB data from the target computer and send USB device data to the target computer. The audio virtualization device further comprises a processor configured to translate the received USB device data from the physical USB input/output interface for output to the network interface, and translate the received USB device data from the network interface for output to the physical USB input/output interface.

In another implementation, a method in a data processing system is provided for virtualization of an audio device, comprising receiving audio device data from the audio device included in a client computer, sending the received audio device data over a network, and receiving audio device data by an audio virtualization device from the client computer over the network. The method further comprises processing the received audio device data, and sending the processed audio device data to a target computer locally connected to the audio virtualization device through a physical USB connection.

DETAILED DESCRIPTION

Figure 1:
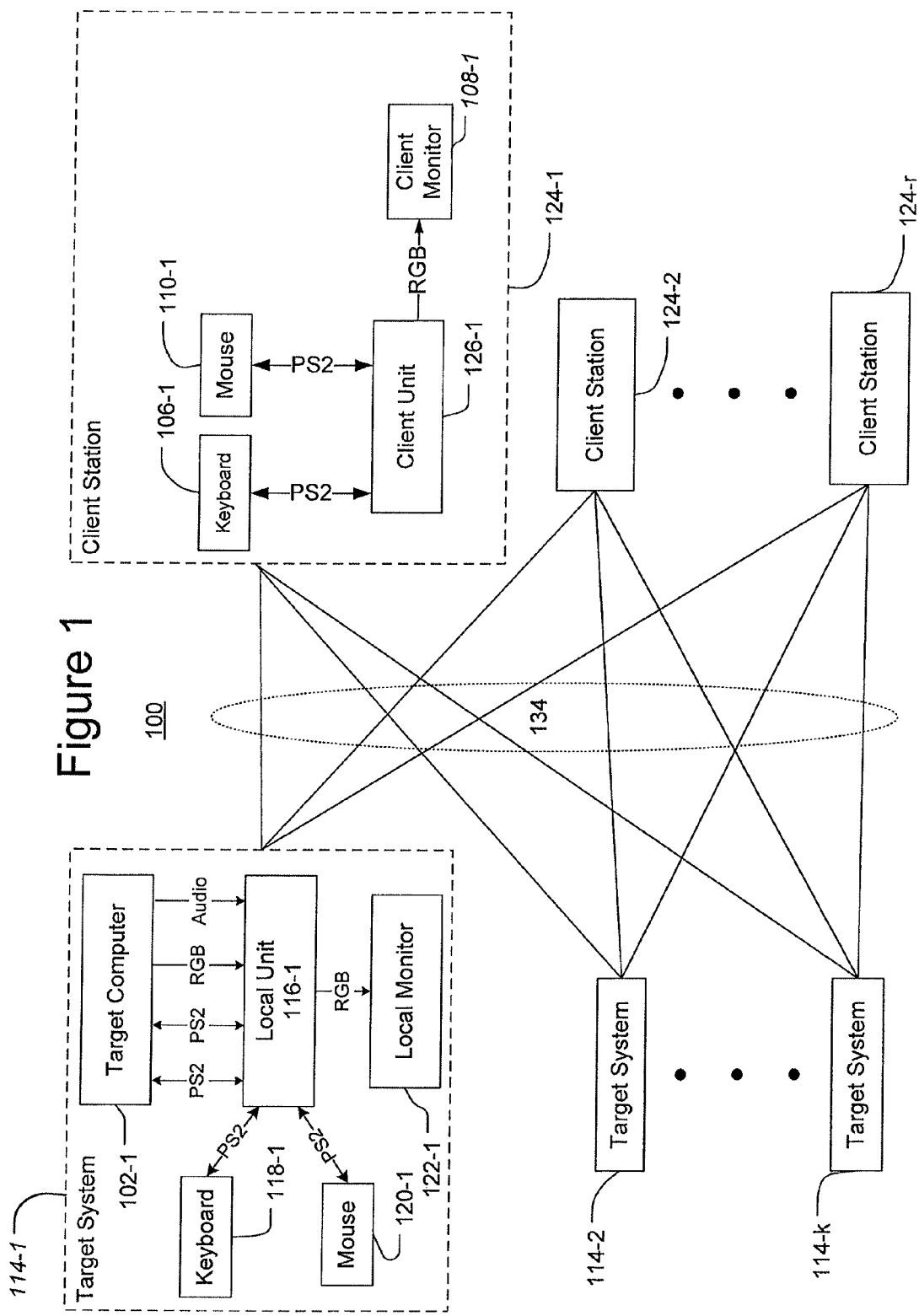
FIG. 1 illustrates an exemplary KVM computer system in accordance methods and systems consistent with the present invention.

Methods and systems in accordance with the present invention allow personal computer users to virtualize a local audio device so that they can remotely connect to a server and interact with the server as if the local audio device was physically connected to the server. They allow audio devices, such as sound cards, microphones, headphones and speakers, to be virtualized so that a remote user may activate and/or attach their audio device to their local PC and then virtualize the audio device so that it can be used with a computer anywhere in the world. In one implementation, they connect a remote audio device virtualization hardware device to the target computer through a physical connection, such as a USB connection, and the device interacts with the local user's computer and audio device over a network. As such, the target system is unaware that the actual audio device is not connected directly to the system through a physical connection, and the target system does not need special software to implement the remote audio device. The remote audio virtualization hardware device connected to the target computer may be physically connected and disconnected, e.g., through a USB port, and the target computer interacts with the device as if it was the audio device, thereby avoiding the installation of special software on the target computer. In these systems, audio devices may be connected to a remote target computer without the target computer knowing that the audio device is not locally connected.

Methods and systems in accordance with the present invention do not require special software on a remote PC. Through the use of a hardware device at the remote location, the connection to the remote PC may be through a normal USB device connection. The device driver and middle layer software for this USB device is typically already installed with the base operating system running on the remote PC. No more software is needed on the remote PC than would be required if a user connected a USB audio device directly to the remote PC. For the target system, the implementation over the network appears the same as a local audio device connected via USB. For example, Windows or Linux is already configured to accept a plug-in USB audio device, and do not require any additional software on the host or target. The operating system operates as if a physical USB audio device is plugged into the target computer.

The lack of a need to have special software on the target computer provides the ability to be flexible, generic and used by a variety of clients and infrastructures with minimal infrastructure requirements. The target computer does not have to be a particular target or have particular software, and as a result, less overhead needs to be developed for implementation.

In the discussion that follows, the computer or system to which the audio device is being virtualized is generally referred to as the target computer or the target system. In some instances, the target computer is also referred to as the local computer, however, components local to the client computer may also be referred to as local. The system that is connected to the audio device to be virtualized is generally referred to herein as the client system.

FIG. 1 depicts an exemplary KVM computer system in accordance methods and systems consistent with the present invention. As mentioned previously, virtual audio systems may be implemented without KVM systems. A KVM system 100 is shown in FIG. 1, where one or more target systems 114-1 . . . 114-$k$ are controlled or accessed by one or more client stations 124-1, 124-2, . . . , 124-$r$ (generally 124). Each target system 114 includes a target computer 102 with associated and attached local unit 116. Each client station 124 generally includes a client unit 126, a keyboard 106, a video monitor 108, and a mouse (or similar point-and-click device) 110, although some client stations may only include a video display 108 and a client unit. Operation of a particular target computer 102-$i$ may be remotely viewed on the video monitor 108 of any of the client stations 124, and the keyboard 106 and mouse 110 of the client station 124 may be used to provide keyboard and mouse input to the target computer 102-$i$. As shown in FIG. 1, in a KVM system 100, a client station 124 is able to control or access more than one target computer. Note that the lines drawn between target systems and client stations in FIG. 1 represent potential (and not necessarily actual) wired or wireless (e.g., RF) links between those sides. Thus, each target computer 102 may be controlled or accessed by more than one client station 124, and each client station 124 may control more than one target computer 102. The client station 124, in one implementation, may be located within several hundred feet of the target system 114.

Furthermore, in certain contexts, the target system 114 is considered to be a video transmitter or sending unit, and the client system 112 is the video receiving unit or receiver, although both units transmit and receive. Generally, video travels from target system 114 to client station 124, while keyboard and mouse data move from client station to target system.

As shown in FIG. 1 the local or target system 114 includes a target computer 102 and an associated local unit 116. The local system 114 may also include a keyboard 118, a mouse (or other point-and-click-type device) 120 and a local monitor 122, each connected to the local unit 116 directly. The client station 124 includes a client unit 126. The local or target computer 102 may be a computer, a server, a processor or other collection of processors or logic elements. Generally, a target computer may include any processor or collection of processors. By way of example, a target computer may be a processor or collection of processors or logic elements located (or embedded) in a server, a desktop computer (such as a PC, Apple Macintosh or the like), a kiosk, an ATM, a switch, a set-top box, an appliance (such as a television, DVR, DVD player and the like), a vehicle, an elevator, on a manufacturing or processing production line. A collection of target computers 102 may be a collection of servers in a rack or some other collection; they may be independent of each other or connected to each other in a network or by some other structure. The local and client monitors 122, 108, may be digital or analog.

The local unit 116 is a device or mechanism, e.g., a printed circuit board ("PCB"), that is installed locally to the target/local computer 102. This device may be close to, but external to the computer, or may be installed inside the computer's housing. Regardless of the positioning of the local unit 116, in one implementation, there is a direct electrical connection between the target computer 102 and the local unit 116.

Various components on the local/target system 114 communicate wirelessly or via a wired connection with components on the client station 124 via a wireless connection link 134. In one implementation, the network connection or link 134 may use any suitable protocols and methods of communication.

The local unit 116 receives local mouse and keyboard signals, e.g., USB or PS2 signals. These signals are provided by the local unit 116 to the target computer 102. The target computer 102 generates video output signals, e.g., RGB (Red, Green, Blue) signals, which are provided to the local unit 116 which, in turn, provides the signals to drive the local monitor 122. The target computer 102 may also generate audio output signals which are provided to the local unit 116. As noted, the target computer 102 need not have a keyboard, mouse or monitor, and may be controlled entirely by a client station 124.

Local unit 116 transmits image data for transmission to a client station 124 (e.g., via client unit 126). Some or all of the data may be compressed before being transmitted. Additionally, local unit 116 may receive mouse and keyboard data (from a client station 124), which is then provided to the local/target computer 102. The target computer 102 may execute the data received and may display output on its local monitor 122.

The client station 124 receives video data from the local unit 116 of the target computer 102, via a wired or wireless connection (e.g., 802.11a wireless connection 134). The client unit 126 receives (possibly compressed) video data (not all of the data need be compressed) from the local unit 116. The client unit 126 decompresses (as necessary) the video data from the local unit 116 and provides it to the appropriate rendering device, e.g., to the client monitor 108, which displays the video data. Additionally, client mouse 110 and keyboard 106 may be used to generate appropriate signals (e.g., PS2 signals or USB) that may be transmitted via client unit 126 to local unit 116 for execution on target computer 102.

Figure 2:
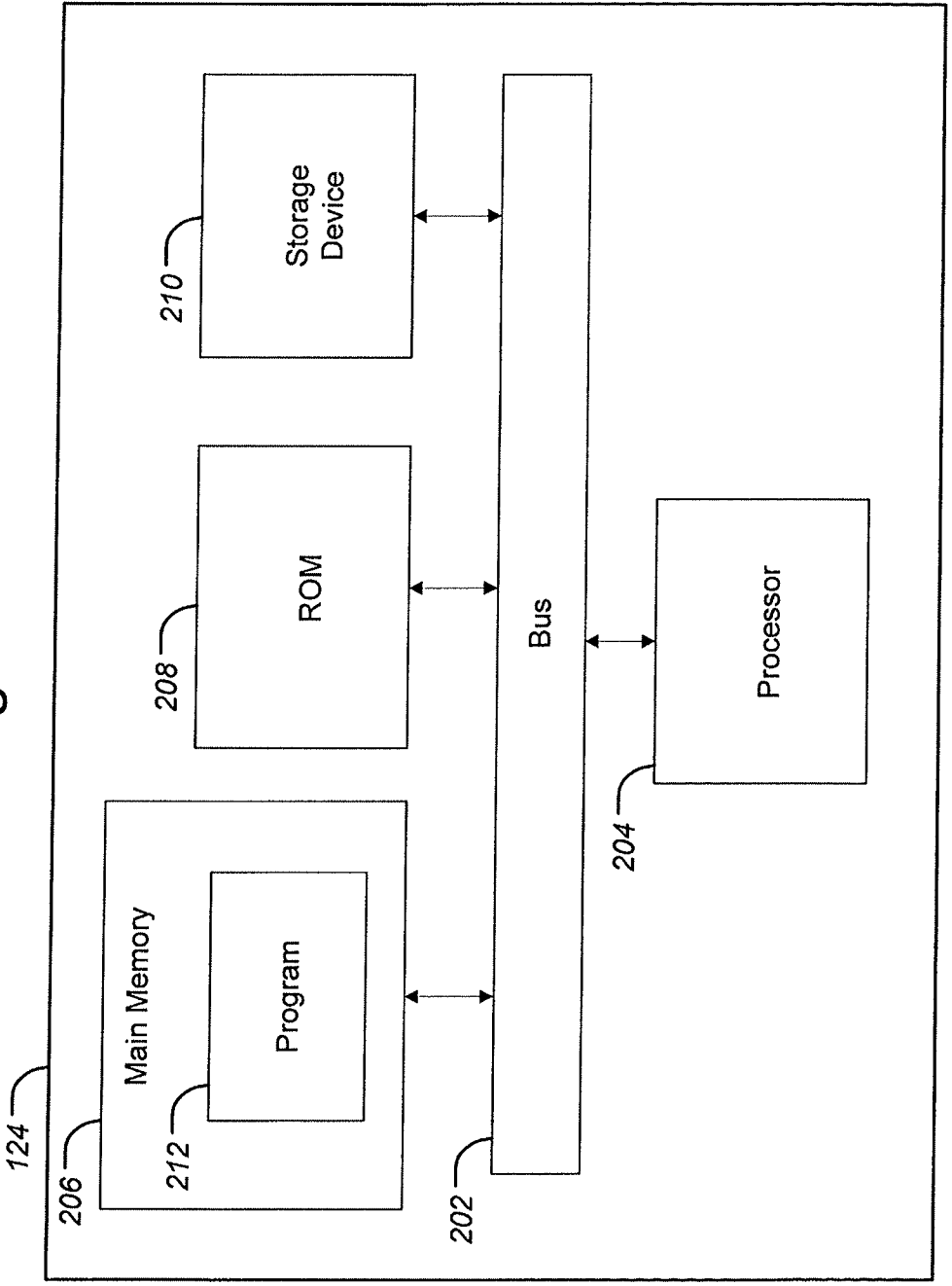
FIG. 2 illustrates an exemplary target computer system consistent with systems and methods consistent with the present invention.

FIG. 2 illustrates an exemplary client computer system consistent with systems and methods consistent with the present invention. Client computer 124 includes a bus 202 or other communication mechanism for communicating information, and a processor 204 coupled with bus 202 for processing the information. Client station 124 may also include similar components as client computer 124, including some or all of the components mentioned. Client computer 124 also includes a main memory 206, such as a random access memory (RAM) or other dynamic storage device, coupled to bus 202 for storing information and instructions to be executed by processor 204. In addition, main memory 206 may be used for storing temporary variables or other intermediate information during execution of instructions to be executed by processor 204. Main memory 206 includes a program 212 for implementing processing consistent with methods and systems in accordance with the present invention. Client computer 124 further includes a Read-Only Memory (ROM) 208 or other static storage device coupled to bus 202 for storing static information and instructions for processor 204. A storage device 210, such as a magnetic disk or optical disk, is provided and coupled to bus 202 for storing information and instructions.

According to one embodiment, processor 204 executes one or more sequences of one or more instructions contained in main memory 206. Such instructions may be read into main memory 206 from another computer-readable medium, such as storage device 210. Execution of the sequences of instructions in main memory 206 causes processor 204 to perform processes described herein. One or more processors in a multi-processing arrangement may also be employed to execute the sequences of instructions contained in main memory 206. In alternative embodiments, hard-wired circuitry may be used in place of or in combination with software instructions. Thus, embodiments are not limited to any specific combination of hardware circuitry and software.

Although described relative to main memory 206 and storage device 210, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Figure 3:
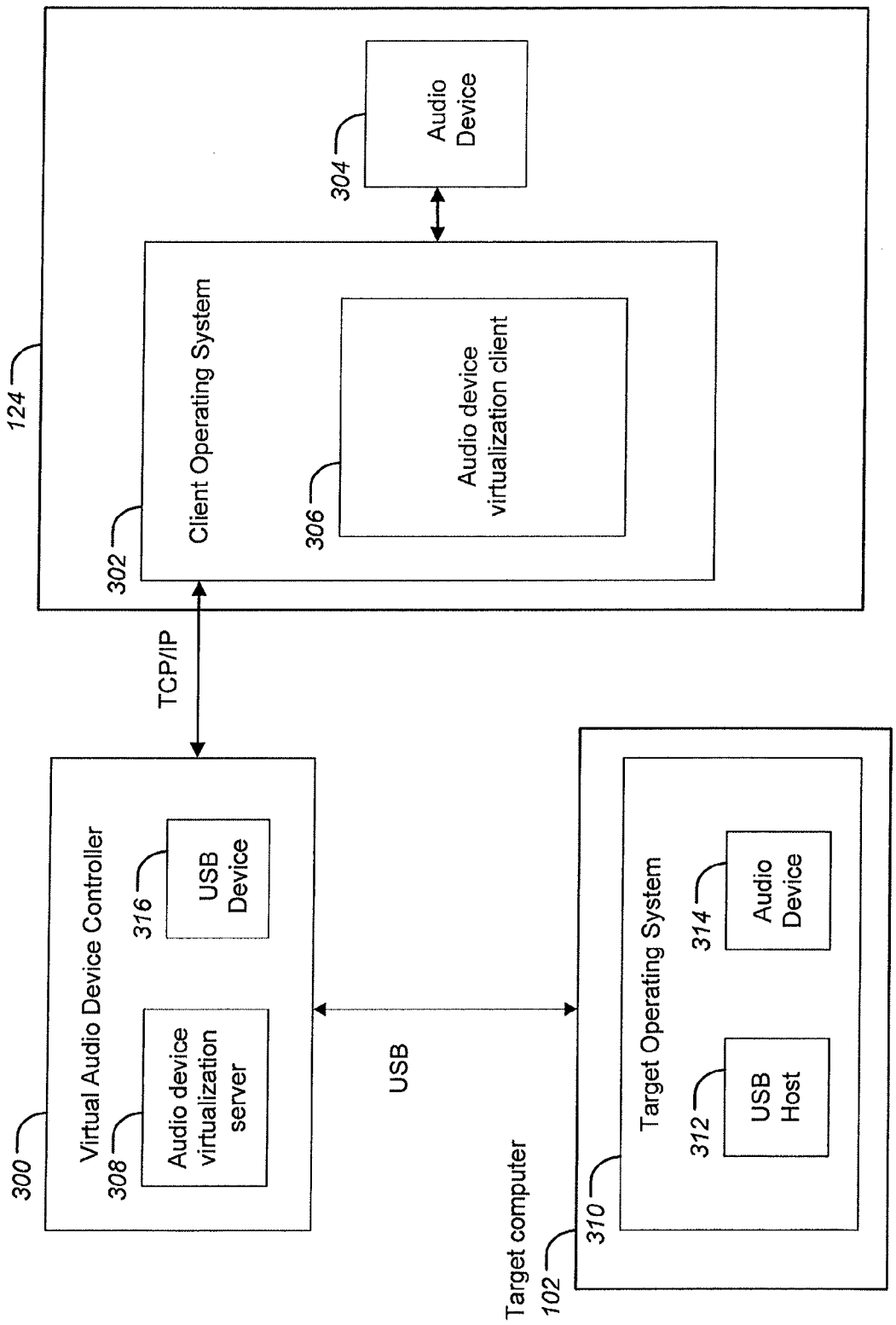
FIG. 3 depicts an audio virtualization device in a computer network in accordance with methods and systems consistent with the present invention.

FIG. 3 depicts a virtual audio device controller 300 in a computer network in accordance with methods and systems consistent with the present invention. As shown on the Figure, the client station 124 includes a client operating system 302 which may connect to audio devices 304, e.g., sound cards, audio software applications, microphones, speakers, or any other suitable component. In one implementation, the audio device 304 may be an audio-related component of the client operation system 302. A client user may activate and/or plug their audio device 304 on the client station 124 so that it can interact remotely with the target computer 102. The audio device 304 may also be built into the client computer 124. Although the audio device 304 may not be a USB device, it may appear to the target 102 to be USB device.

The target operating system 310 on the target computer 102 may be a normal operating system. Further, the target computer 102 may include one or more USB connections and may connect to USB devices such as audio USB devices or any other suitable components.

The client operating system 302 also includes an audio device virtualization client component 306, which may be software on the client computer 124 which interacts with the remote target virtual audio device controller 300, which in one implementation, is a hardware device. The client computer 124, for example, may download the audio device virtualization client component 306. The audio device virtualization client component 306 communicates with the audio device virtualization server 308 remotely over a network using TCP/IP or any other suitable protocol, and interacts with the local audio device 304. The audio device virtualization client component 306 translates the audio data from the local audio device 304 into USB format to be transmitted over the network.

In one implementation, the virtual audio device controller 300 is a hardware component that includes the audio device virtualization server 308 which may be firmware, software, or hardware for interacting remotely with the audio device virtualization client component 306 and locally with the target computer 102 and target computer operating system 304. This virtual audio device controller 300 may be plugged into the target computer 102 with a physical connection, such as a USB connection. In one implementation, the audio device virtualization server 308 communicates with the audio device virtualization client component 306 in the Avocent Virtual USB Protocol (AVUP) developed by Avocent, Inc. However, other suitable protocols and methods are possible.

The audio device 304 in the client system 124, may, for example, be a combination of hardware and software. At this point, the system may ask the user whether they want to virtualize the audio device 304 upon user request to a remote target computer 102. When the audio device 304 to a user has indicated virtualization of the device, the audio device virtualization client 306 sends a notification to the audio device virtualization server 308 that a new audio device 304 is being virtualized. In this notification, the audio device virtualization client 306 transmits the type of device it is, the number of endpoints (e.g., how many different types of functions it can perform) and begins a bi-directional flow of information including status and data and requests for status and data, pursuant to the USB protocol. Digitized audio data may be sent from the audio device virtualization client 306 to the virtual audio device controller 300. In one implementation, this digitized audio data is sent in isochronous transfers, streaming real-time transfers useful for transmitting data at a constant rate, or by a specific time and where occasional errors can be tolerated.

Upon receiving the notification of the new audio device 304, the audio device virtualization server 308 on the virtual audio device controller 300 plugged into the target computer 102 configures its USB device 316 that interfaces with the USB host 312 on the target computer. The USB device 316 may be a physical component that plugs into the USB jack on the target computer 102 and also comprises configurable software. The software on the USB device 316 is configured to emulate the audio device 304 that is being virtualized on the client computer 124. When signals are received from the audio device 304 on the client computer 124, this USB device 316 on the virtual audio device controller 300 emulates the signals received and sends those signals to the target computer 102 via the USB host 312. It also receives USB signals from the target computer 102 and sends them to the audio device 304 on the client computer 124 via the USB device virtualization client 306.

When the USB host 312 on the target computer 102 requests status, for example, the audio device virtualization client 306 responds back with the status. Audio device virtualization client 306 may also inform the target computer 102 that it has data to send, and the target computer may respond to proceed with the transmission.

The virtual audio device controller 300 receives information for audio device interaction, such as USB device commands or packets, from the target operating system 310 and they are processed by the audio device virtualization server 308 on the virtual audio device controller 300. The audio device virtualization server 308 processes and transmits the USB commands in the AVUP protocol over TCP/IP to the audio device virtualization client component 306. The virtual audio device controller 300 includes a processor that runs audio device virtualization server software 308, and that processor may also have a USB device 316 built in. It uses a network connection to connect to the client computer 124, and a USB device connection to connect to the target computer 102. The virtual audio device controller 300 translates USB commands and responses from the network format to the USB format and vice versa.

For example, the audio device virtualization server 308 receives the USB command from the target computer 102, and sends it over the network to the audio device virtualization client component 306. The response to the USB command traverses back from the audio device virtualization client component 306 to the audio device virtualization protocol server 308 on the virtual audio device controller 300, and through the physical USB connection to the target computer 102. In one implementation, the USB device commands may conform to the USB specification for USB devices 304.

On the client system 124, the audio device virtualization client component 306 uses services provided by the client operating system 302, such as the sound card or audio service in the operating system, to send the audio device command out to the audio device 304 on or connected to the client computer.

Figure 4:
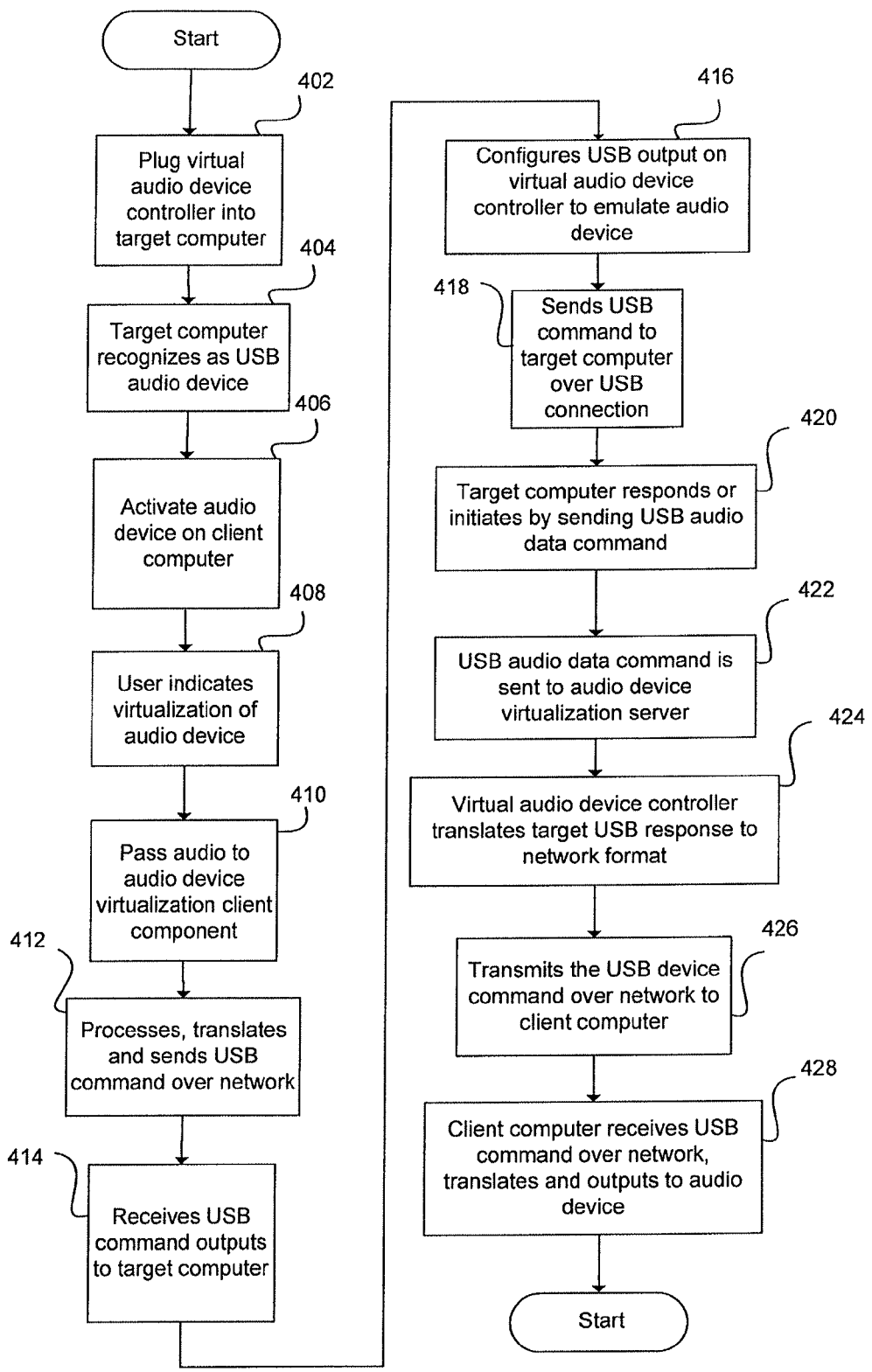
FIG. 4 illustrates a flowchart of exemplary steps of a method for audio device virtualization in a computer network in accordance with methods and systems consistent with the present invention

FIG. 4 illustrates a flowchart of exemplary steps of a method for audio device virtualization in a computer network in accordance with methods and systems consistent with the present invention. First, a virtual audio device controller 300 is activated and/or plugged into a target computer 102 via a physical connection (such as USB) and connects its USB device 316 with the USB host 312 (step 402). The target operating system 310 recognizes the USB-connected virtual audio device controller 300 as a local audio USB device and operates accordingly (step 404). Additionally, an audio device 304 to be virtualized is activated on the client computer 124 (step 406). Upon prompting by the system, the user indicates that they would like the audio device 304 to be virtualized to the target computer 102 (step 408).

The audio device 304 on or attached to the client computer 124 passes the audio data to the audio device virtualization client component 306 (step 410). Initially, these commands may indicate the presence and identification of the audio device and may later include relevant status and data. Further, the audio device virtualization client component 306 processes the received audio device commands and data, translates it to USB and sends it over the network to the audio device virtualization server 308 on the virtual audio device controller 300 (step 412). Then, the audio device virtualization server 308 receives the USB command to be outputted to the target operating system 310 on the target computer 102 (step 414). The audio device virtualization server 308 also configures the USB device 316 on the virtual audio device controller 300 to emulate the audio device 304 locally connected to the client computer system 124 (step 416). The USB device 316 then sends the USB command information to the target operating system 310 via the USB host 312 to which it is connected (step 418).

The target operating system 310 may respond or initiate USB interaction by transmitting a USB device command, e.g., status or data request, over the USB connection to the virtual audio device controller 300 as it would to a physically-connected local audio device 304 (step 420). This response or initiation may include audio data. Next, the USB device 316 on the virtual audio device controller 300 receives the USB device command and passes it to audio device virtualization server 308 (step 422). Furthermore, the audio device virtualization server 308 on the virtual audio device controller 300 receives the USB command and translates it to a protocol used by the audio device virtualization server 308 and the audio device virtualization client component 306, such as the AVUP protocol (step 424).

The audio device virtualization server 308 transmits the USB command over the network to the remote client computer 124 (step 426). The remote client computer's operating system 302 receives the USB command and passes it to the audio device virtualization client component 306 (step 428) to translate it to audio data to be outputted to the audio device 304.

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A data processing system for virtualization of an audio device, comprising:
   a target computer configured to send and receive audio device data to a locally connected audio virtualization device;
   a client computer comprising an audio device;
   the audio virtualization device locally physically connected and physically attached to the target computer such that the target computer interacts with the audio virtualization device as if the audio virtualization device were the audio device plugged in locally physically to the target computer, configured to:
      emulate the client audio device locally to the target computer;
      receive audio device data from the client audio device over a network;
      process the received audio device data; and
      send the processed audio device data to the locally connected target computer through a physical USB connection.

2. The data processing system of claim 1, wherein the audio virtualization device is further configured to:

receive audio device commands from the locally connected target computer;

process the commands to be transmitted over the network; and send the processed audio device commands to the client computer over the network.

3. The data processing system of claim 1, wherein the target computer interacts with the audio virtualization device in the same way the client computer interacts with a locally connected USB audio device.

4. The data processing system of claim 1, wherein all software for remote audio device interaction is on the audio virtualization device and the client computer.

5. The data processing system of claim 1, wherein the client computer is a KVM client that controls the target computer.

6. The data processing system of claim 1, wherein the client computer comprises a program configured to interact with the locally connected audio device and the audio virtualization device.

7. The data processing system of claim 1, wherein communications over the network are TC/PIP communications.

8. An audio virtualization device, comprising:

a network interface configured to interact with a client computer to send audio device data and receive audio device data over a network from an audio device connected to the client computer;

a USB input/output interface configured to physically connect and physically attached to a target computer in a USB port, and to receive USB data from the target computer and send USB device data to the target computer, such that the target computer interacts with the audio virtualization device as if the audio virtualization device were the audio device plugged in locally physically to the target computer; and a processor configured to:

translate the received USB device data from the physical USB input/output interface for output to the network interface; and translate the received USB device data from the network interface for output to the physical USB input/output interface.

9. The audio virtualization device of claim 8, wherein the target computer interacts with the audio virtualization device in the same way the client computer interacts with a locally connected USB audio device.

10. The audio virtualization device of claim 8, wherein the client computer is a KVM client that controls the target computer.

11. The audio virtualization device of claim 8, wherein the client computer comprises a program configured to interact with the audio device and the audio virtualization device.

12. The audio virtualization device of claim 8, wherein the network interface communicates using TCP/IP.

13. The audio virtualization device of claim 8, wherein the audio virtualization device is a hardware device.

14. A method in a data processing system for virtualization of an audio device, comprising:

receiving audio device data from the audio device included in a client computer;

sending the received audio device data over a network;

receiving audio device data by an audio virtualization device from the client computer over the network;

processing the received audio device data; and sending the processed audio device data to a target computer locally connected to the audio virtualization device through a physical USB connection such that the target computer interacts with the audio virtualization device as if the audio virtualization device were the audio device plugged in locally physically to the target computer.

15. The method of claim 14, wherein the audio virtualization device interacts with the target computer in the same way as a locally connected USB audio device.

16. The method of claim 14, wherein all software for remote audio device interaction is on the audio virtualization device and the client computer.

17. The method of claim 14, wherein the client computer is a KVM client that controls the target computer.

18. The method of claim 14, wherein the client computer comprises a program configured to interact with the audio device and the audio virtualization device.

* * * * *